United States Patent
Kato et al.

(10) Patent No.: US 10,994,968 B2
(45) Date of Patent: May 4, 2021

(54) ELEVATOR ROPE ELONGATION MEASURING DEVICE

(71) Applicants: Otis Elevator Company, Farmington, CT (US); Meidensha Corporation, Tokyo (JP)

(72) Inventors: Mitsuru Kato, Inzai (JP); Hideki Miyazawa, Sakura (JP); Yoshiki Nota, Tokyo (JP); Yusuke Watabe, Tokyo (JP)

(73) Assignees: OTIS ELEVATOR COMPANY, Farmington, CT (US); MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/551,996

(22) Filed: Aug. 27, 2019

(65) Prior Publication Data

US 2020/0071131 A1 Mar. 5, 2020

(30) Foreign Application Priority Data

Aug. 29, 2018 (JP) .............................. JP2018-160439

(51) Int. Cl.
  *B66B 7/12* (2006.01)
  *G06T 7/00* (2017.01)
  *G06T 7/60* (2017.01)

(52) U.S. Cl.
  CPC .......... *B66B 7/1238* (2013.01); *G06T 7/0002* (2013.01); *G06T 7/60* (2013.01)

(58) Field of Classification Search
  CPC ........ B66B 7/1238; G06T 7/0002; G06T 7/60
  See application file for complete search history.

(56) References Cited

U.S. PATENT DOCUMENTS 4,887,155 A * 12/1989 Massen ................ D01G 31/006
  348/88
7,117,981 B2 * 10/2006 Logan ................... B66B 7/1238
  187/391

(Continued)

FOREIGN PATENT DOCUMENTS

CN 101292153 B 10/2008
CN 103010887 A * 4/2013

(Continued)

OTHER PUBLICATIONS

Sioma, Andrzej, "3D vision system performs rope wear analysis", Control Engineering, Apr. 22, 2013, 6 pages.

*Primary Examiner* — Maria E Vazquez Colon
(74) *Attorney, Agent, or Firm* — Cantor Colburn LLP (57) ABSTRACT

An elevator rope elongation measuring device provided with: a camera for photographing one or a plurality of elevator ropes R; and an image processing unit for image processing a photographed image output from the camera, wherein: the image processing unit detects an external form portion of the elevator rope R as a regular hill and valley shape T, converts a cyclic length of the hill and valley shape into actual dimensions and makes this a measured value, and finds a ratio of the measured value with respect to a standard value prescribed for the elevator rope as an elongation, therefore attaining the effect of making it unnecessary to have a preliminary installation of a sensor or marker to the rope, or preliminary creation of a database.

16 Claims, 9 Drawing Sheets

(56) References Cited

U.S. PATENT DOCUMENTS

| | | | |
|---|---|---|---|
| 8,254,660 B2* | 8/2012 | Verreet | B66B 7/1238 |
| | | | 382/141 |
| 2011/0268313 A1* | 11/2011 | Winter | G01N 21/952 |
| | | | 382/100 |
| 2012/0294506 A1* | 11/2012 | Verreet | G01N 21/8803 |
| | | | 382/141 |
| 2017/0057788 A1* | 3/2017 | Helenius | B66B 7/1215 |
| 2019/0359450 A1* | 11/2019 | Kato | B66B 5/0037 |

FOREIGN PATENT DOCUMENTS

| | | | | |
|---|---|---|---|---|
| CN | 102519990 B | | 3/2014 | |
| CN | 104185786 A | * | 12/2014 | ......... G01B 11/2433 |
| CN | 103010887 B | | 5/2015 | |
| CN | 104897071 A | * | 9/2015 | |
| CN | 103025639 B | | 6/2016 | |
| CN | 104185786 B | | 6/2016 | |
| CN | 105890530 A | | 8/2016 | |
| CN | 106477411 A | | 3/2017 | |
| CN | 206223674 U | | 6/2017 | |
| CN | 104897071 B | | 11/2017 | |
| EP | 2383566 B1 | | 10/2013 | |
| JP | 2009057126 A | * | 3/2009 | |
| JP | 2009057126 A | | 3/2009 | |
| JP | 2011105495 A | * | 6/2011 | |
| JP | 5428798 B2 | | 2/2014 | |
| WO | WO-2010092619 A1 | * | 8/2010 | ........... B66B 7/1238 |
| WO | 2015110791 A1 | | 7/2015 | |
| WO | WO-2015110791 A1 | * | 7/2015 | ........... B66B 7/1238 |

* cited by examiner

[FIG. 1]

Roller R

20 Measuring Device

[FIG. 2]

Roller R

ELEVATOR ROPE ELONGATION MEASURING DEVICE

FOREIGN PRIORITY

This application claims priority to Japanese Patent Application No. 2018160439, filed Aug. 29, 2018, and all the benefits accruing therefrom under 35 U.S.C. § 119, the contents of which in its entirety are herein incorporated by reference.

TECHNICAL FIELD

The present invention relates to an elevator rope elongation measuring device and an elevator rope elongation measuring method. The present invention particularly relates to art for measuring the elongation of a rope by processing image data of an elevator rope (hereafter abbreviated as rope) near an elevator hoist photographed with a camera using an analysis device.

BACKGROUND ART

Figure 12:
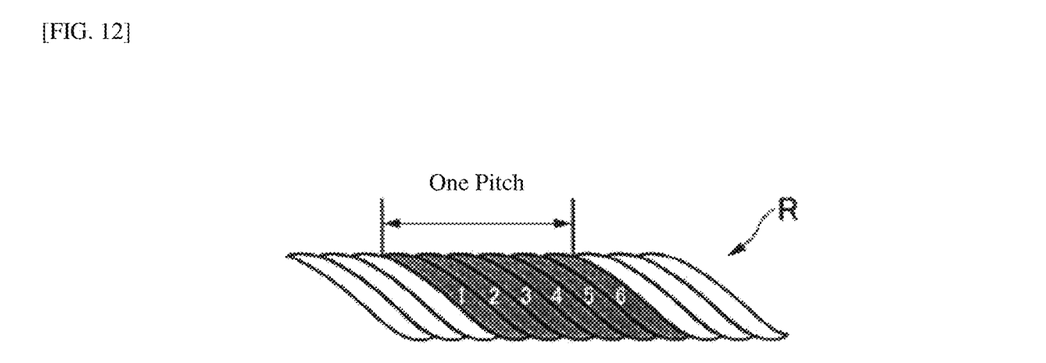
FIG. 12 is a side face view of an elevator rope.

As illustrated in FIG. 12, a length L per one pitch is prescribed by JIS or the like for a rope R, depending on the type.

Here, the length L per one pitch is the length in the rope longitudinal direction until one strand has wrapped around a core cord once, and is referred to as the length of the rope pitch (one twist pitch). For example, with six strands, six times the length of one strand is the length of one pitch. The length of a strand is the length in the rope longitudinal direction.

Note that the rope R is configured by winding one or a plurality of strands in a spiral shape around a core cord, and a strand is composed of a plurality of wires. The number of strands is prescribed by JIS or the like.

The length L of one twist pitch contracts due to the operational conditions or load conditions of the rope R. The deterioration conditions of the rope R can be quickly grasped by detecting the elongation of the rope R.

PRIOR ART LITERATURE

Patent Literature

Patent Literature 19 WO 2016/047330
[Patent Literature 2] Japanese Unexamined Patent Application
Publication No. 2012-171776
[Patent Literature 3] Japanese Unexamined Patent Application Publication No. 2013-147315

SUMMARY OF THE INVENTION

Problem to be Solved by the Invention

Conventionally, the art described in patent literature 1, 2, 3, and the like is developing.

The "elevator rope elongation detection device and method" described in patent literature 1 is a system for measuring a rope elongation based on rope slip. In patent literature 1, abnormal locations cannot be confirmed as images because analysis is not performed using images.

The "rope inspection device for an elevator" described in patent literature 2 is a device for measuring the elongation of a rope by measuring the counterweight installed on the rope. In patent literature 2, preliminary preparations are required to detect the elongation, such as installing the counterweight.

The "elevator speed measuring device, elevator" described in patent literature 3 is a device for measuring the elongation of a rope by comparing images of the rope photographed at different times. In patent literature 3, images must be photographed in advance to detect elongation.

Means for Solving the Problem

The elevator rope elongation measuring device according to claim 1 of the present invention for resolving these problems is provided with: a camera for photographing one or a plurality of elevator ropes; and an image processing unit for image processing a photographed image output from the camera; wherein: the image processing unit detects an external form portion of the elevator rope as a regular hill and valley shape, converts a cyclic length of the hill and valley shape into actual dimensions and makes this a measured value, and finds a ratio of the measured value with respect to a standard value prescribed for the elevator rope as an elongation.

In the elevator rope elongation measuring device according to claim 2 of the present invention for resolving these problems, the image processing unit uses a length of one twist pitch, which is a value created by adding lengths of a strand equal to a number of the strands, which is a distance between hill portions of the hill and valley shape or a distance between valley portions of the hill and valley shape, as the cyclic length of the hill and valley shape.

In the elevator rope elongation measuring device according to claim 3 of the present invention for resolving these problems, the image processing unit uses a length of a strand, which is a distance between hill portions of the hill and valley shape or a distance between valley portions of the hill and valley shape, as the cyclic length of the hill and valley shape.

In the elevator rope elongation measuring device according to claim 4 of the present invention for resolving these problems, the image processing unit uses a length of half of a strand, which is a distance between a hill portion and a valley portion of the hill and valley shape, as the cyclic length of the hill and valley shape.

In the elevator rope elongation measuring device according to claim 5 of the present invention for resolving these problems, the image processing unit determines that an abnormality such as deformation or breakage is occurring on the strand when the measured value is different from the standard value by a prescribed amount or more.

In the elevator rope elongation measuring device according to claim 6 of the present invention for resolving these problems, the image processing unit finds tension loaded on the elevator rope based on the elongation.

In the elevator rope elongation measuring device according to claim 7 of the present invention for resolving these problems, a line sensor camera or area camera is used as the camera.

The elevator rope elongation measuring device according to claim 8 of the present invention for resolving these problems is further provided with an image recording unit for recording a photographed image output from the camera.

The elevator rope elongation measuring method according to claim 9 of the present invention for resolving these problems is for photographing one or a plurality of elevator ropes and image processing a photographed image output from the camera; wherein the image processing detects an external form portion of the elevator rope as a regular hill and valley shape, converts a cyclic length of the hill and valley shape into actual dimensions and makes this a measured value, and finds a ratio of the measured value with respect to a standard value prescribed for the elevator rope as an elongation.

In the elevator rope elongation measuring method according to claim 10 of the present invention for resolving these problems, a length of one twist pitch, which is a value created by adding lengths of a strand equal to a number of the strands, which is a distance between hill portions of the hill and valley shape or a distance between valley portions of the hill and valley shape, is used as the cyclic length of the hill and valley shape.

In the elevator rope elongation measuring method according to claim 11 of the present invention for resolving these problems, a length of a strand, which is a distance between hill portions of the hill and valley shape or a distance between valley portions of the hill and valley shape, is used as the cyclic length of the hill and valley shape.

In the elevator rope elongation measuring method according to claim 12 of the present invention for resolving these problems, a length of half of a strand, which is a distance between a hill portion and a valley portion of the hill and valley shape, is used as the cyclic length of the hill and valley shape.

In the elevator rope elongation measuring method according to claim 13 of the present invention for resolving these problems, it is determined that an abnormality such as deformation or breakage is occurring on the strand when the measured value is different from the standard value by a prescribed amount or more.

In the elevator rope elongation measuring method according to claim 14 of the present invention for resolving these problems, tension loaded on the elevator rope is found based on the elongation.

In the elevator rope elongation measuring method according to claim 15 of the present invention for resolving these problems, a line sensor camera or area camera is used as the camera.

In the elevator rope elongation measuring device according to claim 16 of the present invention for resolving these problems, a photographed image output from the camera is recorded.

Effect of the Invention

Compared to patent literature 1 and patent literature 2, the present invention attains an effect of not requiring the installation of a sensor or marker on the rope in advance.

Furthermore, compared to patent literature 3, the present invention attains an effect of being able to reduce the time required for measurement because it is not required to create a database in advance.

Additionally, the present invention attains an effect of making it possible to measure "the rope elongation for respective one twist pitches," which was not performed in the prior art.

Although the prior art (patent literature 1, patent literature 2, and patent literature 3) cannot determine where there is an issue at any location, even if rope elongation has been detected, the present invention attains an effect of being able to determine abnormal locations for each strand by measuring the length of each strand.

Although the prior art (patent literature 1, patent literature 2, and patent literature 3) cannot determine where there is an issue even if rope elongation has been detected, the present invention has the advantage of being able to measure abnormalities when there is an issue (deformation or breakage) in the strand itself by measuring between the hill and valley of each strand.

While patent literature 2 requires the preliminary preparation of installing a counterweight to the rope to measure the tension on the rope, the present invention has the advantage of being able to measure the relative tension on a rope without requiring preliminary installation of a mark such as a counterweight on the rope.

By using a camera as a line sensor camera that can rapidly photograph images, this attains an effect of being able to photograph images even when the elevator is rapidly rising and falling. Furthermore, by using an area camera that can measure color information, it has an advantage of having a simple ex post facto confirmation.

By further providing an image recording unit for recording photographed images output from the camera, it attains an effect of making to possible to compare the elongation and photographed image of the rope, which are the results of image processing in the image processing unit.

MODES FOR CARRYING OUT THE INVENTION

There are a number of conventional methods for measuring elevator ropes, but the present invention relates to a camera-type elongation measuring method.

By using a camera as the measuring device, a plurality of elevator ropes can be measured at once using one camera, and rope elongation can be safely measured because non-contact measurement is possible.

In the conventional art, there are devices that measure the elongation of a rope from images.

However, they require preparation such as installing a counterweight or preparing a database image such as in patent literature 2 and patent literature 3, and this requires a large amount of time until measurement is performed.

In response to such problems, as one example in the present invention, the rope elongation of one twist pitch can be measured by measuring the length of one strand by performing image analysis on an image photographed using a camera without requiring preliminary preparations.

Furthermore, in addition to rope elongation, the tension on each rope of the elevator can be measured by measuring and comparing the elongation of each rope.

Example 1

Figure 1:
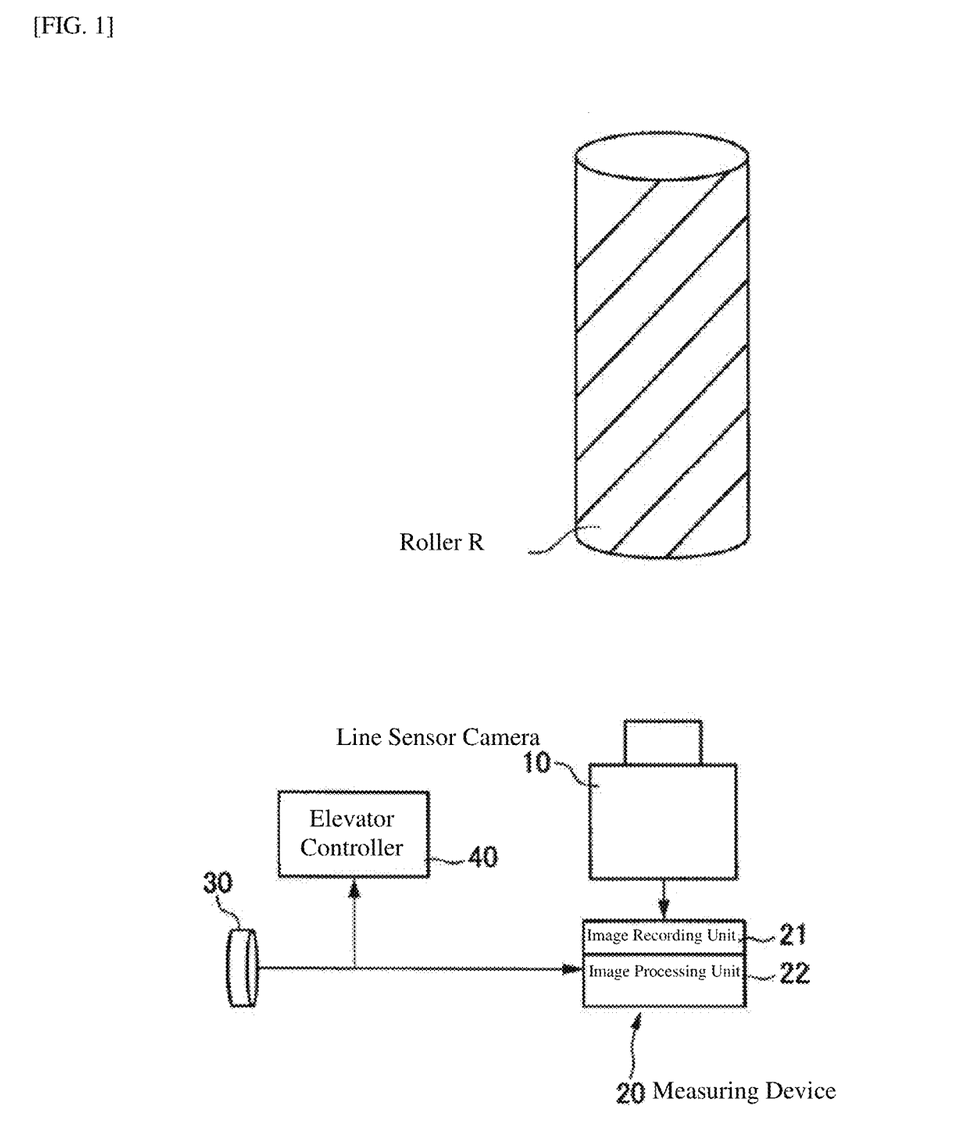
FIG. 1 is a schematic diagram of the elevator rope elongation measuring device according to example 1 of the present invention.

FIG. 1 illustrates the elevator rope elongation measuring device according to example 1 of the present invention. The present example is an example where measurement is performed per one twist pitch.

The elevator rope elongation measuring device of the present example is composed of one line sensor camera 10 for imaging a rope R, and a measuring device 20 into which is inputted a photographed image output by the line sensor camera 10.

The rope R has one or a plurality of strands wound in a spiral shape around a core cord, and each strand is composed of a plurality of wires. The line sensor camera 10 illustrated in FIG. 1 is in a state for imaging the rope R near an elevator hoist (omitted in the drawings).

The line sensor camera 10 is a camera that can rapidly photograph, having a high number of pixels disposed in a line, and the line direction is the horizontal direction, which is also the thickness direction of the rope R.

The line sensor camera 10 continuously photographs the rope R passing through, chronologically synthesizes one line of images, and outputs a synthesized photographed image to the measuring device 20. That is, the one line of continuously photographed images of the line sensor camera 10 is one-dimensional, but the photographed image having the one line of images chronologically synthesized becomes two-dimensional. Note that the chronological synthesis may be performed by an image processing unit 22 in the measuring device 20. As described herein, the measuring device 20 may be implemented by a general personal computer. As such, the image processing unit 22 may be implemented by the general personal computer.

In the drawings, there is one rope R photographed by the line sensor camera 10, but the present invention is not limited thereto, and there may be a plurality of ropes. That is, the elevator rope elongation measuring device of the present example can perform image processing on a photographed image of a plurality of ropes R output from the line sensor camera 10.

By using the line sensor camera 10 that can rapidly photograph images in the present example, images can be photographed even when the elevator is rapidly rising and falling.

The measuring device 20 is composed of an image recording unit 21 for recording photographed images output from the line sensor camera 10, and an image processing unit 22 for image processing the photographed images output from the line sensor camera 10. As described herein, the measuring device 20 may be implemented by a general personal computer.

The image processing unit 22 executes an image analysis for detecting the rope elongation, as described below.

The photographed image recorded in the image recording unit 21 is used when comparing with the rope elongation that is the result of image processing by the image processing unit 22.

While a position/speed detection signal from position/speed detection means 30 such as an encoder is input as a photograph start trigger signal in the measuring device 20, the position/speed detection signal from the position/speed detection means 30 is input to an elevator controller 40. The position/speed detection means 30 is provided on the elevator hoist.

The line sensor camera 10 starts continuous photographing in synchronization with the photograph start trigger signal, the photographed image output from the line sensor camera 10 is recorded in the image recording unit 21, and image analysis is started by the image processing unit 22.

A position signal of the elevator may be input as a photograph start trigger signal to the measuring device 20 from the elevator controller 40, and the photographed line of the camera may be synchronized with the elevator position. The position of the rope R may be used as the elevator position.

The measuring device 20 can be implemented as hardware, but versatility improves if it is implemented by installing predetermined software on a general personal computer. Mobility also increases if a laptop computer is used as the personal computer.

<Method for Measuring Length of Single Strand>

The rope elongation at one twist pitch can be measured by adding the length of each single strand together. For example, the one twist pitch illustrated in FIG. 12 has the length of six strands added together.

Figure 3:
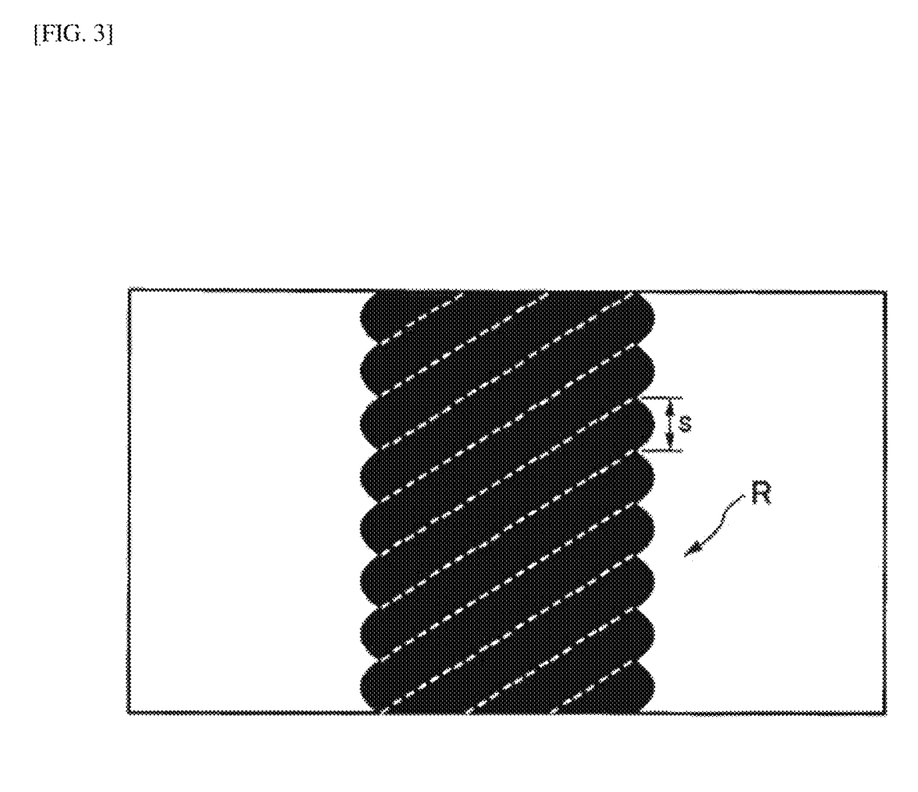
FIG. 3 is a description diagram illustrating a photographed image photographing one rope.

The surface of the rope R has regular hills and valleys due to the strands wound in a spiral shape thereon, and as illustrated in FIG. 3, the length s of one strand is the length from valley portion to valley portion on the rope external form portion when the rope R is photographed using a camera.

It therefore becomes possible to measure the length of one twist pitch by measuring the length s of the respective single strands using image processing and adding a number of lengths equal to the number of strands prescribed for the rope R.

Furthermore, the elongation amount can be measured by comparing the measured length of the one twist pitch with a standard value, and when there is a plurality of ropes R, the tension on the ropes R can be measured by comparing the respective one twist pitch lengths.

The method for measuring the length s of one strand will be described below.

When measuring one strand, it is first required to acquire the external form information of the rope R.

Figure 4:
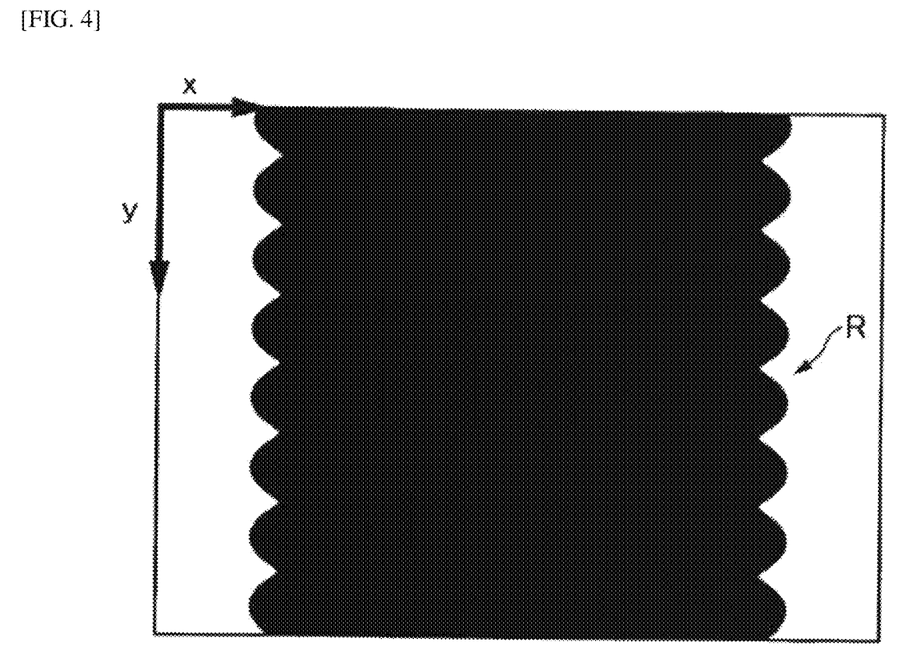
FIG. 4 is a description diagram illustrating a photographed image after binarization.

Therefore, as in FIG. 4, binarization processing is performed on an image, the background portion is processed as white, and the rope portion is processed as black.

When noise occurs during binarization, noise removal is performed using an image processing method such as region determination by a median filter or labeling processing.

Furthermore, the arrows in FIG. 4 are the respective x and y coordinates with the upper left corner of the image as the starting point, and these same coordinates are used in the drawings thereafter unless otherwise noted. The x coordinate is the thickness direction of the rope R, and the y coordinate is the length direction of the rope R, that is, the chronological direction.

Figure 5:
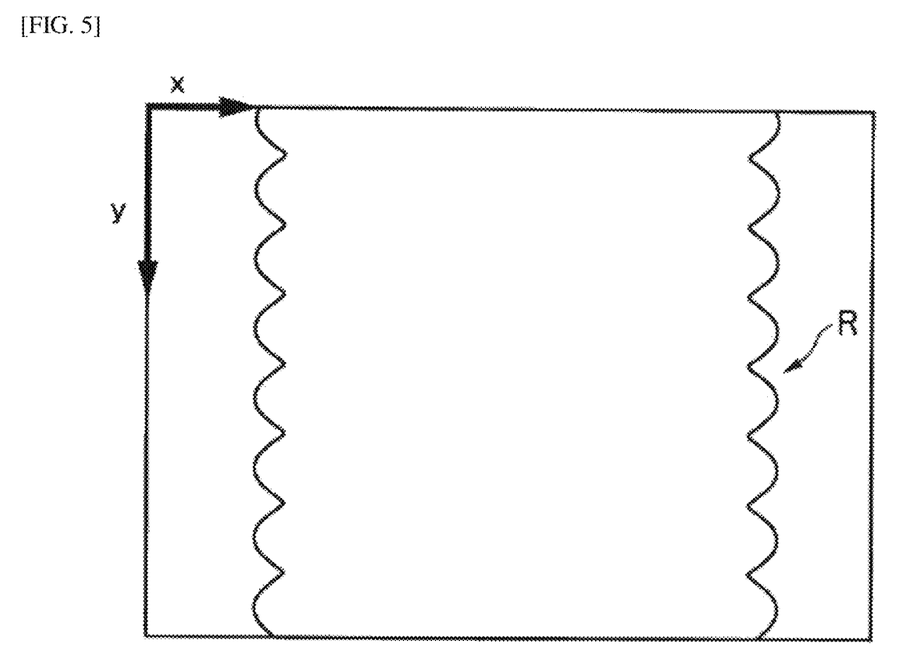
FIG. 5 is a description diagram illustrating a photographed image after edge detection.

Next, edge detection is performed on the binarized image as illustrated in FIG. 5.

By performing edge detection, the external form portion of the rope R can be detected as a regular hill and valley shape T.

Figure 7:
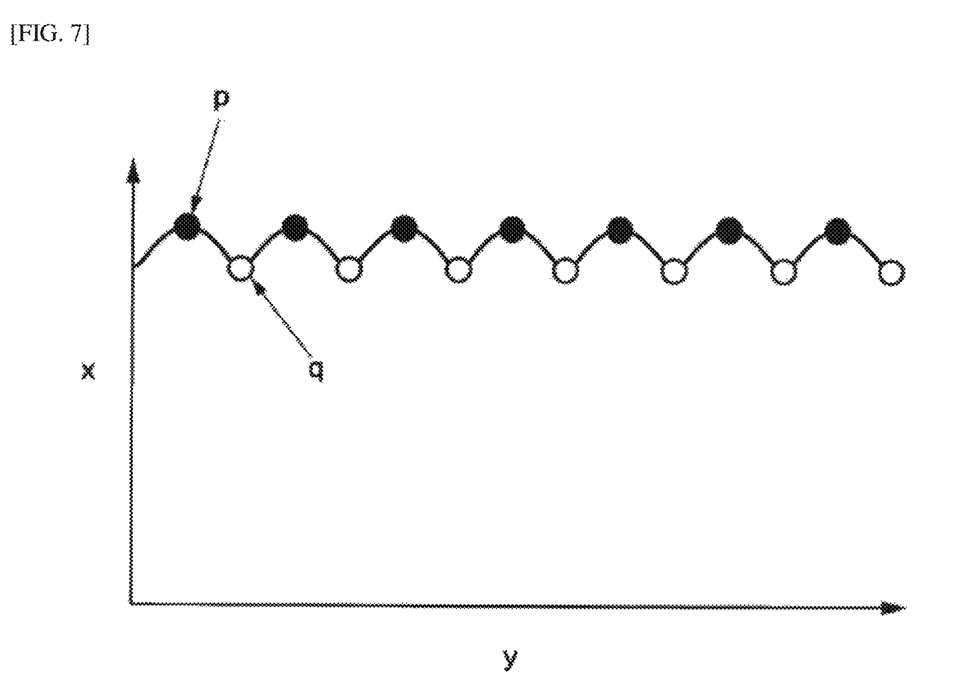
FIG. 7 is a graph illustrating a hill-valley portion of the rope.

As illustrated in FIG. 7, a detection of the hill (convex) portions and valley (concave) portions of the regular hill and valley shape T of the rope R is then performed.

During the detection of the hill-valley portions, detection of the hill-valley portions is performed focusing on one edge from among the detected left and right edges of the rope R.

First, the method for detecting the hill and valley when focusing on the right side edge will be described, then the left side will be described.

Figure 6:
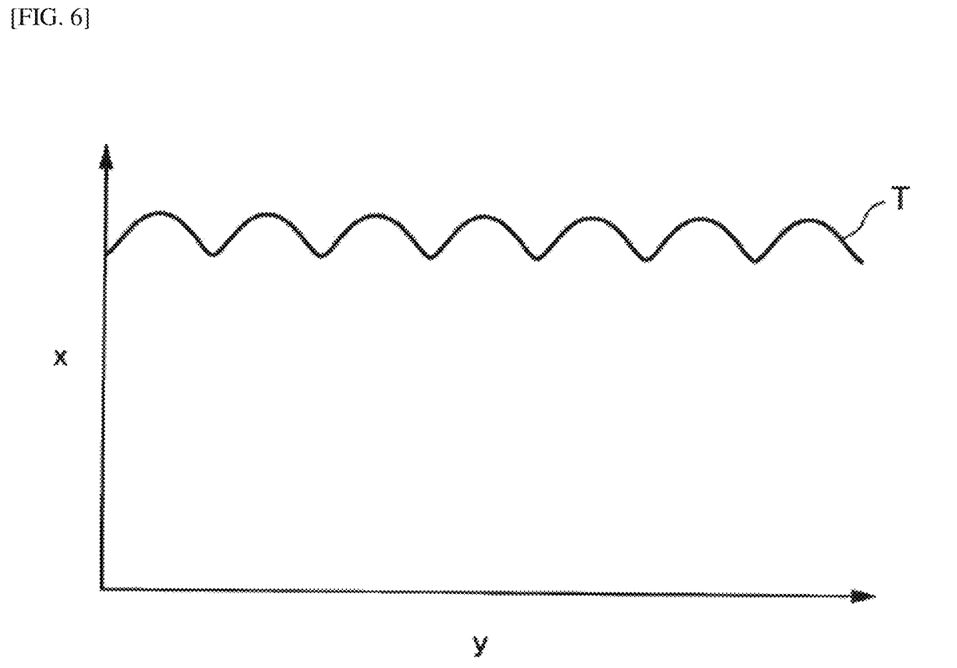
FIG. 6 is a graph illustrating a right side edge.

A graph of the right side edge of the rope is illustrated in FIG. 6 with a horizontal axis x and a vertical axis y.

At this time, as illustrated in FIG. 7, the hill portions may be detected as a maximum value (black circle) p, and the valley portions may be detected as a minimum value (white circle) q.

Furthermore, for the left side edge, the hill portions may be detected as the minimum value, and the valley portions may be detected as the maximum value.

The length between single strands is measured by converting each valley portion and the difference in y coordinate values between the valley portions (number of pixels) detected above to their actual size.

Methods (a) to (d) below may be taken when converting to actual size. Furthermore, the number of peaks of hills may be counted when measuring the number of strands.

(a) Use the pitch information in the y-axis direction calculated using the position information acquired from position/speed detection means such as an encoder of an external elevator controller.

(b) Obtain the pitch information in the y-axis direction by inputting the actual measured value for one of the plurality of ropes R and using this value as the standard value.

(c) Obtain the pitch information in the y-axis direction by comparing the position information of the start position and stop position during rope measurement and the number of hills between those regions.

(Stop position−Start position)/Total hill number=length of one strand (d) Find based on correlation with the measure (ruler) disposed adjacent to the rope R.

Figure 8:
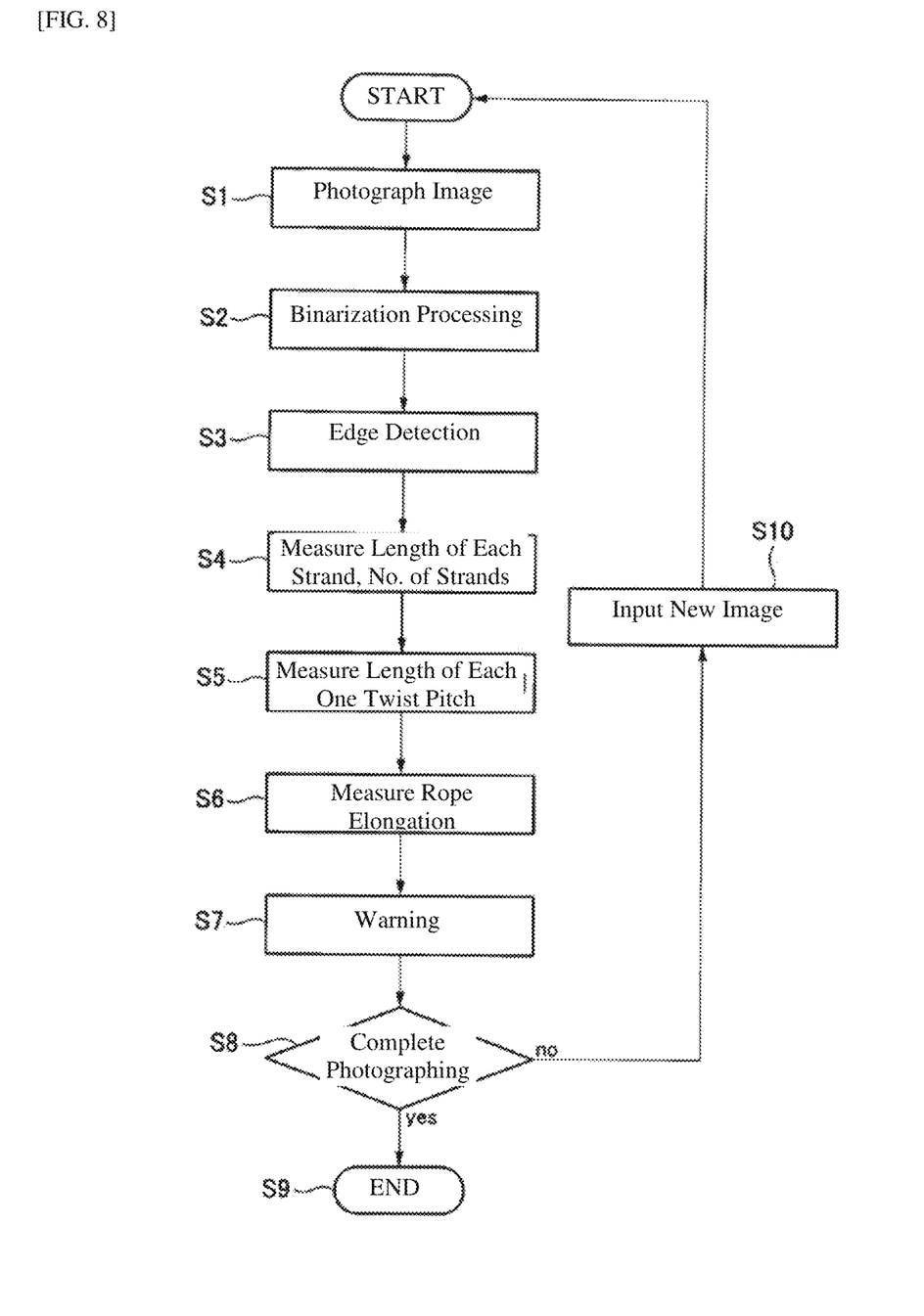
FIG. 8 is a flowchart of the elevator rope elongation measuring method according to example 1 of the present invention.

The elevator rope elongation measuring method of the present example will be described using the flowchart in FIG. 8.

(1) Image Input

First, the photograph pitch of the rope R is uniformly photographed by varying the camera photograph cycle using the position information acquired from the elevator controller 40. This photograph pitch is made constant, photographing is performed continuously using the line sensor camera 10, and the photographed images are input to the measuring device 20 (step S1).

(2) Binarization Processing

Next, binarization processing is performed on the input images (step S2). In the binarization processing, detection is performed so that the background is white and the rope portion is black. When noise occurs during binarization, noise removal is performed using median filter or labeling processing region determination.

(3) Edge Detection

The outer diameter (edge) of the rope R is then detected to detect the position of the rope R from the input image (step S3).

For example, the image of the rope R in the drawings is scanned in the horizontal direction, and the locations changing from a black portion to a white portion, or locations changing from a white portion to a black portion are the edges, and are the outer diameter of the rope.

(4) Measure the Length of One Strand

The length between single strands is then detected using the method described above (step S4).

When converting to the actual size from a number of pixels, the pitch information in the y-axis direction calculated using the position information acquired from position/speed detection means such as, for example, an encoder of an external elevator controller, is used. Furthermore, the number of strands at this time is also measured in the same manner (5) Measure the Length of One Twist Pitch If the number of strands detected in the previous step becomes a prescribed value, the length of each strand is added, and the length of one twist pitch is measured as a measured value (step S5).

(6) Measuring Rope Elongation

The rope elongation is measured by contrasting the measured value found in step 5 with respect to the standard value prescribed in regard to the length of one twist pitch of the rope R in advance (step S6).

(7) Warning

Additionally, a warning is given when the rope elongation found in step 6 exceeds a predetermined threshold value (step S7). This increases safety because inspection and maintenance may be performed based on the warning. A speaker (omitted from the drawings) is mounted on the measuring device 20 as means for giving a warning.

(8) Photograph Completion

After this, it is determined whether photographing is completed across a predetermined length or the entire length of the rope R (step S8), and all processes are completed when photographing is complete (step S9).

(9) Input of Newly Photographed Images

When photographing is not complete, the newly photographed image is input (step S10), and step S1 to step S7 are repeated from photographed images that are newly photographed.

As described above, according to the present example, a photographed image of the rope R is first acquired from the line sensor camera 10 (step S1), binarization processing is then carried out on the acquired photographed image (step S2), edge detection of the photographed image is then performed (step S3), the length between single strands is detected (step S4), the length of the one twist pitch is then measured as a measured value (step S5), and because the rope elongation is measured after this by contrasting the measured value with respect to the standard value (step S6), there is the effect of not needing to install a sensor or marker on the rope in advance compared to patent literature 1 and patent literature 2, and of being able to decrease the amount of time required for measurement because a database does not need to be created in advance compared to patent literature 3.

Additionally, it has the effect of making it possible to measure "the rope elongation for respective one twist pitches", which was not performed in the prior art.

Example 2

The elevator rope elongation measuring device according to example 2 of the present invention will be described referring to FIG. 9. The present example measures the length per single strand.

The present example is similar to example 1 in that it uses the elevator rope elongation measuring device illustrated in FIG. 1.

Figure 9:
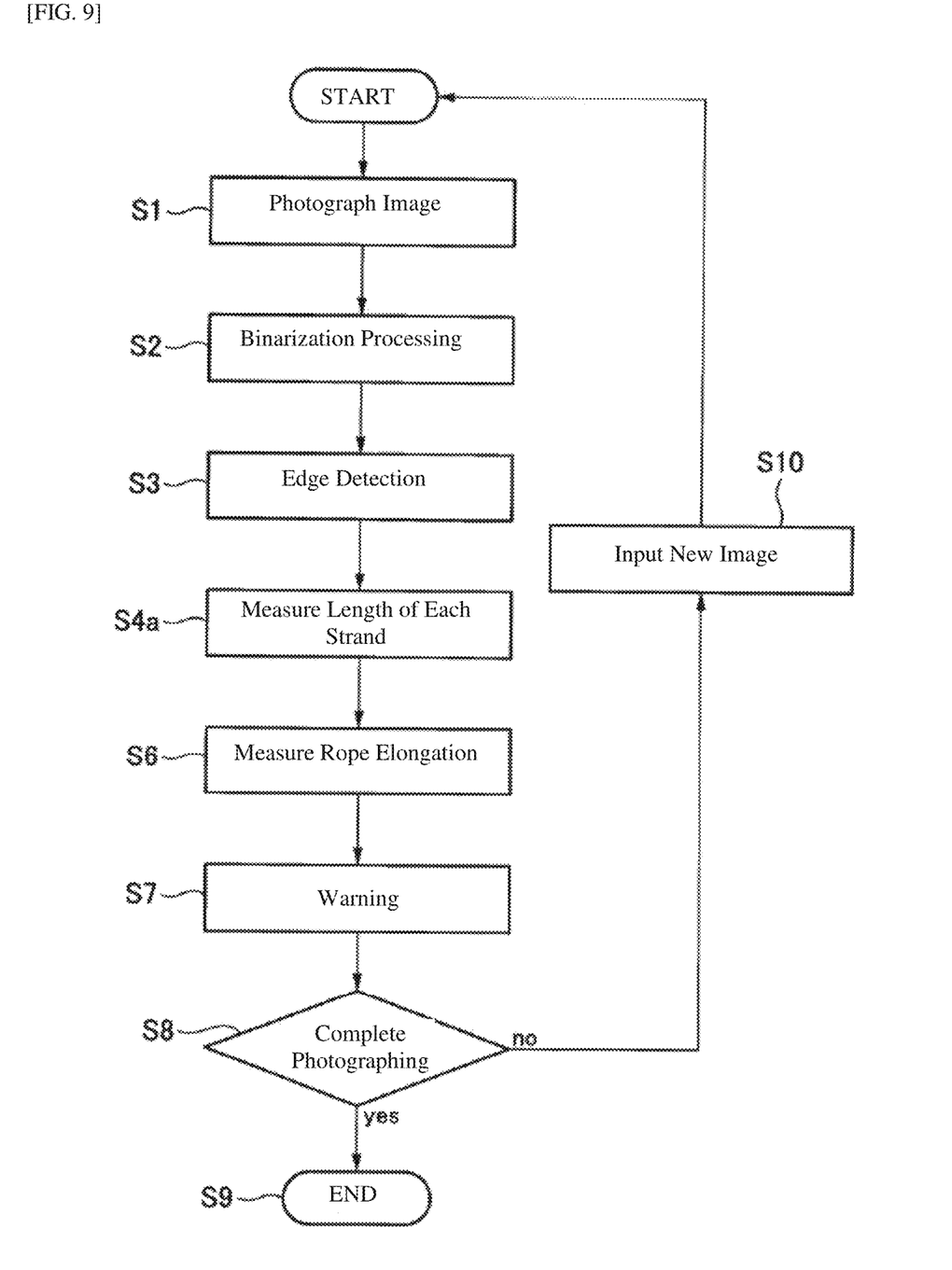
FIG. 9 is a flowchart of the elevator rope elongation measuring method according to example 2 of the present invention.

The elevator rope elongation measuring method in the present example is different from example 1 in that measurement is performed for each strand as illustrated in the flowchart in FIG. 9.

That is, it is the same as example 1 from step S1 to step S4, and from step S6 to step S10, but instead of measuring the length of each strand and the number of strands in step S4, a measurement of the length of each strand is performed (step S4a), and step S5 is omitted.

The present example has the advantage of being able to measure abnormalities when only a specific strand elongates by measuring each strand.

That is, although the prior art (patent literature 1, patent literature 2, and patent literature 3) cannot determine where there is an issue even if an elongation has been detected in the rope, the present example has the advantage of always being able to measure abnormalities when there is an issue (deformation or breakage) in the strand itself by measuring between the hill and valley of each strand.

Example 3

The elevator rope elongation measuring device according to example 3 of the present invention will be described referring to FIG. 10. The present example measures the length of the rope between the hill and valley of each strand.

The present example is similar to example 1 in that it uses the elevator rope elongation measuring device illustrated in FIG. 1.

Figure 10:
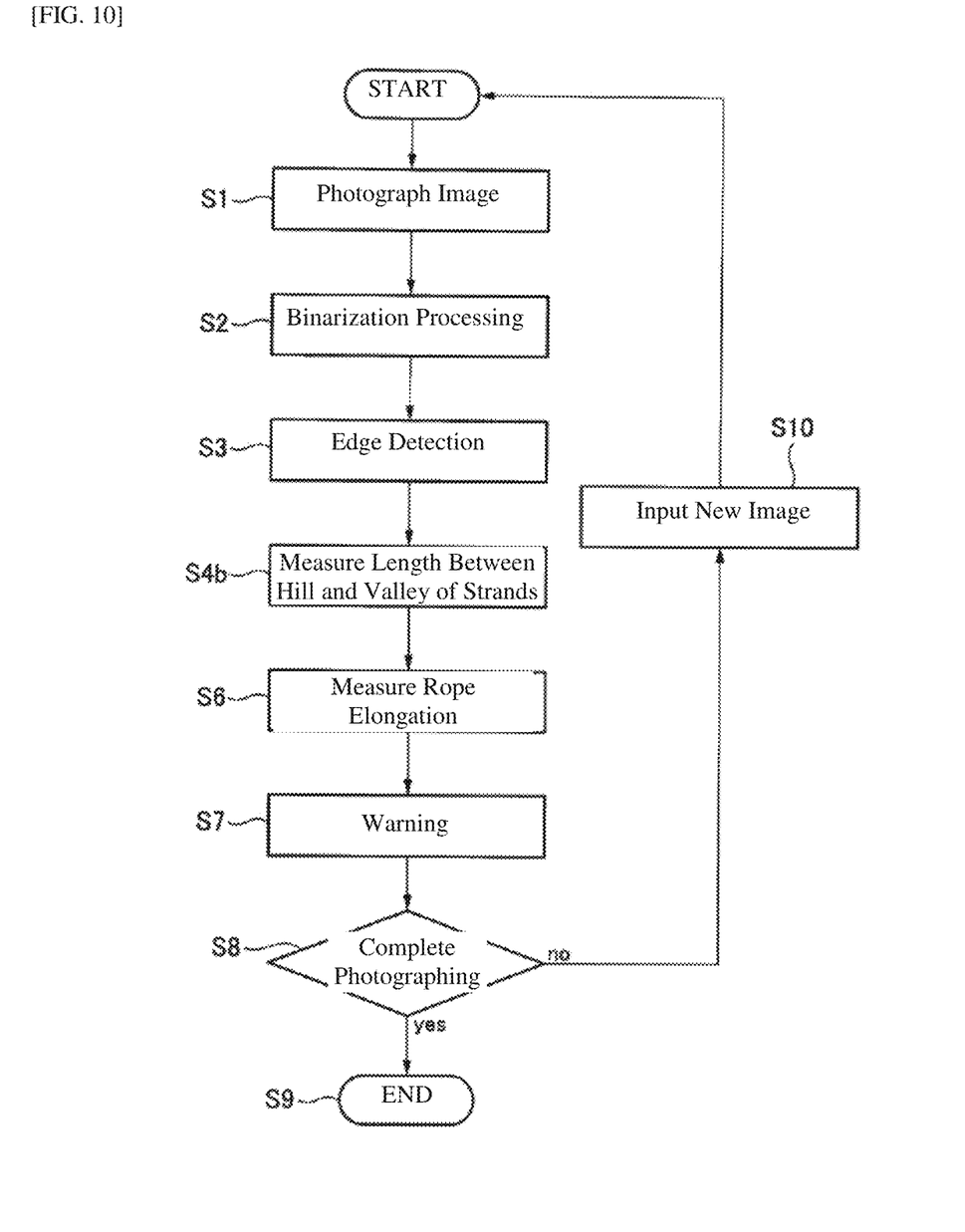
FIG. 10 is a flowchart of the elevator rope elongation measuring method according to example 3 of the present invention.

The elevator rope elongation measuring method in the present example is different from example 2 in that measurement is performed between the hill and valley of each strand in a more detailed manner as illustrated in the flowchart in FIG. 10.

That is, it is the same as example 1 from step S1 to step S4, and from step S6 to step S10, but it is different from example 2 in that instead of measuring the length of each strand (step S4a), a measurement of the length between the hill and valley of the strands is performed (step S4b).

As illustrated in FIG. 7, the present example has the advantage of being able to measure abnormalities when there is an issue (deformation or breakage) in the strand itself by measuring between the hill and valley of each strand.

That is, although the prior art (patent literature 1, patent literature 2, and patent literature 3) cannot determine where there is an issue even if an elongation has been detected in the rope, the present example has the advantage of always being able to measure abnormalities when there is an issue (deformation or breakage) in the strand itself by measuring between the hill and valley of each strand.

Example 4

The elevator rope elongation measuring device according to example 4 of the present invention will be described referring to FIG. 11. The present example measures the tension on each rope R.

Figure 11:
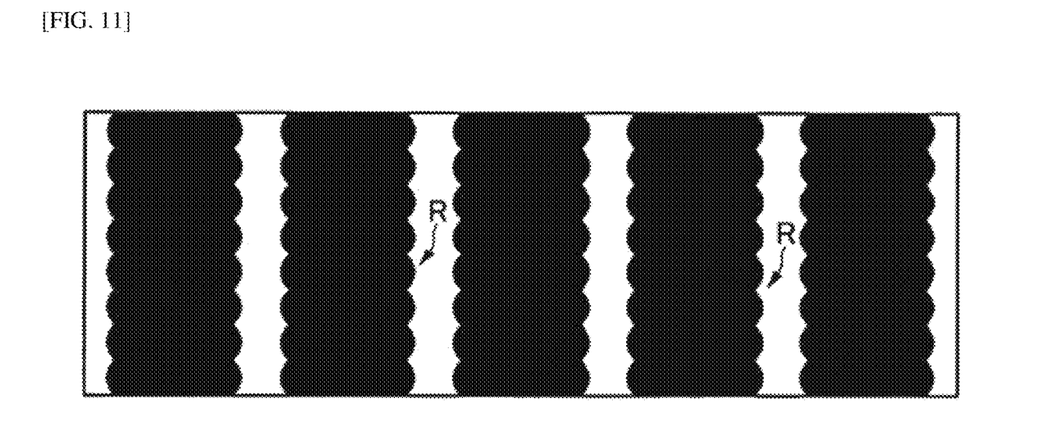
FIG. 11 is an explanatory view of a photographed image photographing a plurality of ropes.

The present example, as illustrated in FIG. 11, photographs a plurality of ropes R simultaneously, and the constitution other than this is the same as example 1 in that it uses the elevator rope elongation measuring device illustrated in FIG. 1.

That is, the present example measures the elongation of all of the photographed plurality of ropes R using image processing.

Therefore, differences in elongation amount between the plurality of ropes R can be measured, and differences in relative tension on each rope R can be measured by measuring differences in rope elongation.

That is, while patent literature 2 requires the preliminary preparation of installing a counterweight to the rope to measure the tension on the rope, the present example has the advantage of being able to measure the relative tension on a rope without requiring preliminary installation of a mark such as a counterweight on the rope.

Example 5

Figure 2:
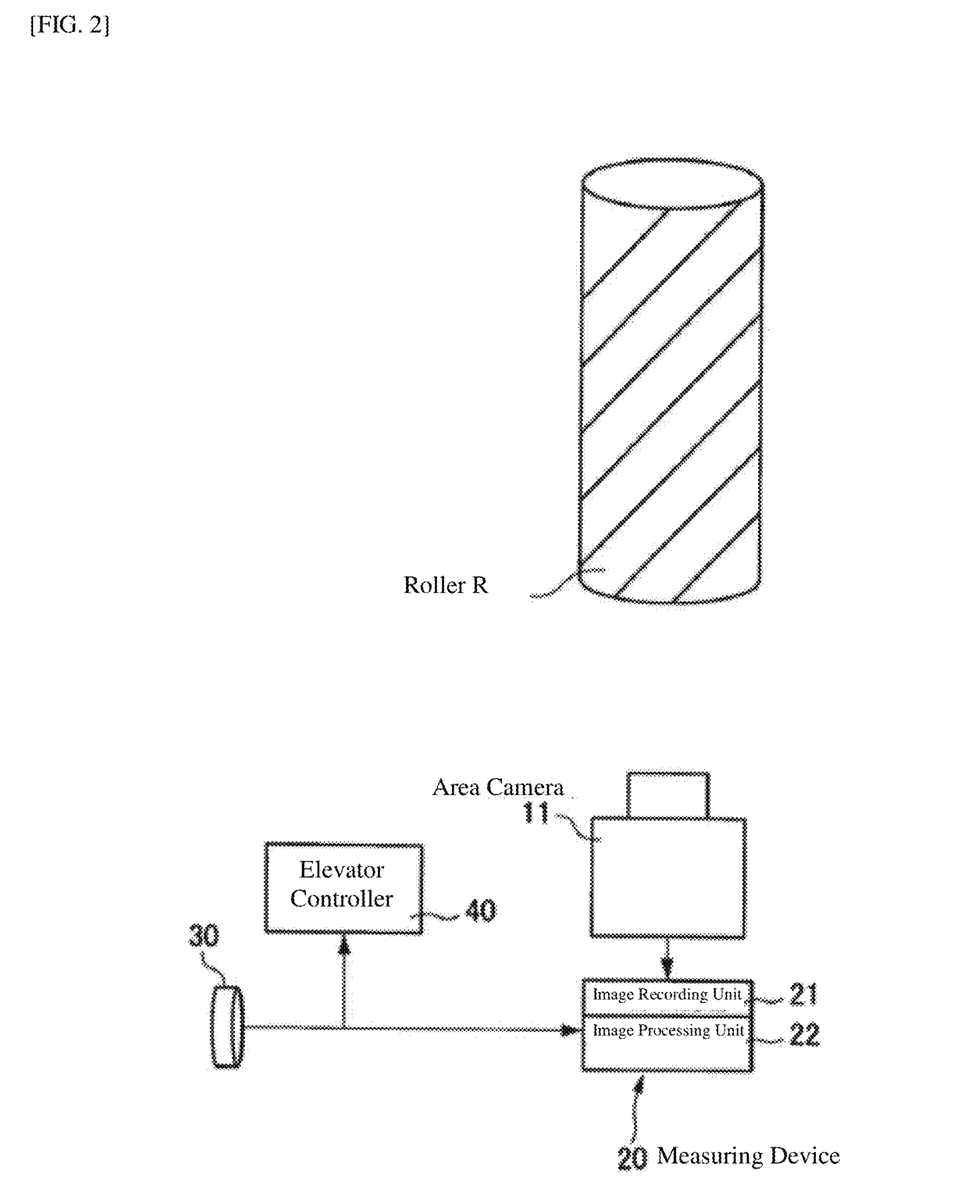
FIG. 2 is a schematic diagram of the elevator rope elongation measuring device according to example 5 of the present invention.

FIG. 2 illustrates the elevator rope elongation measuring device according to example 5 of the present invention. The elevator rope elongation measuring device in the present example uses an area camera 11 instead of the line sensor camera 10 used in example 1.

The area camera 11 is a camera disposing a large number of pixels vertically and horizontally, and can photograph a two-dimensional image of the rope R when still in a single capture. The photographed two-dimensional image is output to the measuring device 20 as a photographed image.

Furthermore, the pixels of the area camera 11 in the horizontal direction are extracted as one line, and similar to the line sensor camera 10, one-dimensional images of the moving rope R are continuously photographed, and a two-dimensional image synthesized in chronological order may be output to the measuring device 20 as a photographed image. That is, the area camera 11 may be used in a similar manner to the line sensor camera 10.

Furthermore, by using an area camera that can measure color information, there is an advantage of simple ex post facto confirmation.

Other constitutions are the same as example 1 described above, and attain the same effects.

INDUSTRIAL APPLICABILITY

The present invention can be used widely in many industries as an elevator rope elongation measuring device.

DESCRIPTION OF REFERENCE NUMERALS

10 Line sensor camera
11 Area camera
20 Measuring device
21 Image recording unit
22 Image processing unit
30 Speed/position detection means
40 Elevator controller
R Elevator rope (rope)
T Regular hill and valley shape
s Length of one strand

What is claimed is:

1. An elevator rope elongation measuring device comprising:
   a camera for photographing one or a plurality of elevator ropes; and
   an image processing unit for image processing a photographed image output from the camera; wherein:
   the image processing unit detects an external form portion of the elevator rope as a regular hill and valley shape, converts a cyclic length of the hill and valley shape into actual dimensions and makes this a measured value, and finds a ratio of the measured value with respect to a standard value prescribed for the elevator rope as an elongation.

2. The elevator rope elongation measuring device according to claim 1, wherein the image processing unit uses a length of one twist pitch, which is a value created by adding lengths of a strand equal to a number of the strands, which is a distance between hill portions of the hill and valley shape or a distance between valley portions of the hill and valley shape, as the cyclic length of the hill and valley shape.

3. The elevator rope elongation measuring device according to claim 1, wherein the image processing unit uses a length of a strand, which is a distance between hill portions of the hill and valley shape or a distance between valley portions of the hill and valley shape, as the cyclic length of the hill and valley shape.

4. The elevator rope elongation measuring device according to claim 1, wherein the image processing unit uses a length of half of a strand, which is a distance between a hill portion and a valley portion of the hill and valley shape, as the cyclic length of the hill and valley shape.

5. The elevator rope elongation measuring device according to claim 1, wherein the image processing unit determines that an abnormality such as deformation or breakage is occurring on a strand when the measured value is different from the standard value by a prescribed amount or more.

6. The elevator rope elongation measuring device according to claim 1, wherein the image processing unit finds tension loaded on the elevator rope based on the elongation.

7. The elevator rope elongation measuring device according to claim 1, wherein a line sensor camera or area camera is used as the camera.

8. The elevator rope elongation measuring device according to claim 1, further comprising an image recording unit for recording a photographed image output from the camera.

9. An elevator rope elongation measuring method for photographing one or a plurality of elevator ropes and image processing a photographed image output from a camera; wherein the method comprises:

detecting an external form portion of the elevator rope as a regular hill and valley shape;

converting a cyclic length of the hill and valley shape into actual dimensions and makes this a measured value, and finding a ratio of the measured value with respect to a standard value prescribed for the elevator rope as an elongation.

10. The elevator rope elongation measuring method according to claim 9, wherein a length of one twist pitch, which is a value created by adding lengths of a strand equal to a number of the strands, which is a distance between hill portions of the hill and valley shape or a distance between valley portions of the hill and valley shape, is used as the cyclic length of the hill and valley shape.

11. The elevator rope elongation measuring method according to claim 9, wherein a length of a strand, which is a distance between hill portions of the hill and valley shape or a distance between valley portions of the hill and valley shape, is used as the cyclic length of the hill and valley shape.

12. The elevator rope elongation measuring method according to claim 9, wherein a length of half of a strand, which is a distance between a hill portion and a valley portion of the hill and valley shape, is used as the cyclic length of the hill and valley shape.

13. The elevator rope elongation measuring method according to claim 10, wherein it is determined that an abnormality such as deformation or breakage is occurring on the strand when the measured value is different from the standard value by a prescribed amount or more.

14. The elevator rope elongation measuring method according to claim 9, wherein tension loaded on the elevator rope is found based on the elongation.

15. The elevator rope elongation measuring method according to claim 9, wherein a line sensor camera or area camera is used as the camera.

16. The elevator rope elongation measuring method according to claim 9, wherein a photographed image output from the camera is recorded.

* * * * *